(12) United States Patent
Yasuda et al.

(10) Patent No.: US 8,484,449 B2
(45) Date of Patent: Jul. 9, 2013

(54) PROGRAM, COMMUNICATION DEVICE, DATA PROCESSING METHOD, AND COMMUNICATION SYSTEM

(75) Inventors: Yasunori Yasuda, Kanagawa (JP); Ikuo Shinozaki, Saitama (JP)

(73) Assignee: Sony Corporation, Tokyo (JP)

( * ) Notice: Subject to any disclaimer, the term of this patent is extended or adjusted under 35 U.S.C. 154(b) by 1687 days.

(21) Appl. No.: 11/115,120

(22) Filed: Apr. 27, 2005

(65) Prior Publication Data

US 2005/0268087 A1 Dec. 1, 2005

(30) Foreign Application Priority Data

May 26, 2004 (JP) ................................ 2004-155922

(51) Int. Cl.
G06F 9/00 (2006.01)
G06F 15/177 (2006.01)
G06F 21/00 (2006.01)
G06F 17/00 (2006.01)
G06F 11/00 (2006.01)
G06F 12/14 (2006.01)
G06F 12/16 (2006.01)

(52) U.S. Cl.
USPC .................. 713/2; 713/1; 713/156; 713/168; 713/176; 713/182; 726/1; 726/27; 726/32; 726/34; 380/255; 380/258; 380/266; 380/270

(58) Field of Classification Search
USPC .......... 713/2, 176, 1, 168, 156, 182; 380/255, 380/258, 266, 270; 726/1, 27, 32, 34
See application file for complete search history.

(56) References Cited

U.S. PATENT DOCUMENTS

| 6,067,582 | A  | * | 5/2000 | Smith et al. | 710/5 |
| 6,243,468 | B1 | * | 6/2001 | Pearce et al. | 380/255 |
| 6,349,338 | B1 | * | 2/2002 | Seamons et al. | 709/229 |
| 7,222,062 | B2 | * | 5/2007 | Goud et al. | 703/23 |

(Continued)

FOREIGN PATENT DOCUMENTS

| JP | 10-257047 | 9/1998 |
| JP | 2001-358674 | 12/2001 |

(Continued)

OTHER PUBLICATIONS

Trusted Computing Platform Alliance (TCPA), Main Specifiction Version 1.1.b published by the Trusted Computing Group (TCG) (Feb. 2002).*

(Continued)

*Primary Examiner* — Edan Orgad
*Assistant Examiner* — Kari Schmidt
(74) *Attorney, Agent, or Firm* — Oblon, Spivak, McClelland, Maier & Neustadt, L.L.P.

(57) ABSTRACT

There is provided a program for making a computer perform a first procedure for verifying whether an platform guaranteeing that device identification data for identifying a communication device cannot be rewritten by the user is provided in the communication device, a second procedure for verifying whether the device identification data included in a registration request received from the communication device is not yet registered, and a third procedure for registering the device identification data included in the registration request and issuing user identification data to the user when the program determines in the first procedure that the platform is provided and determines in the second procedure that the device identification data is not yet registered.

14 Claims, 10 Drawing Sheets

U.S. PATENT DOCUMENTS

| | | | |
|---|---|---|---|
| 7,353,531 B2 * | 4/2008 | Brown et al. | 726/1 |
| 7,398,393 B2 * | 7/2008 | Mont et al. | 713/168 |
| 7,751,568 B2 * | 7/2010 | Catherman et al. | 380/270 |
| 2001/0052075 A1 * | 12/2001 | Feinberg | 713/168 |
| 2003/0037233 A1 * | 2/2003 | Pearson | 713/156 |
| 2003/0204712 A1 * | 10/2003 | Inui et al. | 713/1 |
| 2004/0015690 A1 * | 1/2004 | Torigai et al. | 713/156 |
| 2004/0054919 A1 * | 3/2004 | Duri et al. | 713/200 |
| 2005/0243619 A1 * | 11/2005 | Brown et al. | 365/202 |

FOREIGN PATENT DOCUMENTS

| | | |
|---|---|---|
| JP | 2003-162340 | 6/2003 |
| JP | 2003-271809 | 9/2003 |
| JP | 2003-288277 | 10/2003 |
| JP | 2004-23630 | 1/2004 |
| JP | 2004-54323 | 2/2004 |

OTHER PUBLICATIONS

Hiroshi Maruyama, et al, "Software Integrity Verification Technique, Information Processing", Information Processing Society of Japan, vol. 45, No. 4, Apr. 15, 2004, pp. 354-359.

* cited by examiner

PROGRAM, COMMUNICATION DEVICE, DATA PROCESSING METHOD, AND COMMUNICATION SYSTEM

CROSS REFERENCES TO RELATED APPLICATIONS

The present invention contains subject matter related to Japanese Patent Application No. 2004-155922 filed in the Japan Patent Office May 26, 2004, the entire contents of which being incorporated herein by reference.

BACKGROUND OF THE INVENTION

1. Field of the Invention

The present invention relates to a program, a communication device, a data processing method, and a communication system guaranteeing anonymity and singularity of a user in communication of a network etc.

2. Description of the Related Art

There are communication systems where a server apparatus provides for example chat rooms, bulletin boards, auction sites, and other sites for communication among a plurality of users. In such a communication system, the server apparatus for example maintains the anonymity of a user by issuing a user a unique anonymous user ID in that server apparatus in accordance with a registration request from the user. After this, the user uses the anonymous user ID issued to it to participate in the above communication.

However, in the above-mentioned system, a single user can operate his or her own terminal to transmit a plurality of registration requests to a server apparatus to acquire a plurality of anonymous user ID's.

With this, there is the disadvantage that the singularity of users cannot be maintained at the sites for communication provided by the server apparatus.

Alternatively, it is possible to steal another person's ID. If a password is not protected, a user can freely set it, so theft is simple. Even if the password is protected, there is the disadvantage of the password itself being stolen (leaked due to eavesdropping etc., guessed, etc.) and again the possibility of theft. If looking over the current state of affairs, this sort of disadvantage frequently occurs.

To solve this disadvantage, there is the system in which the user provides his or her own personal information to a TTP (Trusted Third Party), has his or her own legitimacy (singularity) verified based on that, and has the above server apparatus issue a anonymous user ID based on the results. See for example Japanese Unexamined Patent Publication (Kokai) No. 2003-122946.

SUMMARY OF THE INVENTION

However, in the above-mentioned communication system of the related art, the user has to provide the server apparatus of the TTP with his or her personal information to get it to verify him. There is the disadvantage that this is not desirable from the viewpoint of the confidentiality of personal information.

Further, in the above-mentioned communication system of the related art, the user terminal has to communicate with not only the server apparatus providing the site for communication, but also the server apparatus of the TTP, so there is the disadvantage of a large load in communication processing.

In the present invention, it is desirable to provide a program, a communication device, a data processing method, and a communication system able to issue a anonymous user ID guaranteeing user anonymity and singularity without a user providing personal information.

To solve the disadvantage in the above-mentioned related art, according to a first embodiment of the present invention, there is provided a program for making a computer perform a first procedure for verifying whether an platform guaranteeing that device identification data for identifying a communication device cannot be rewritten by the user is provided in the communication device, a second procedure for verifying whether the device identification data included in a registration request received from the communication device is not yet registered, and a third procedure for registering the device identification data included in the registration request and issuing user identification data to the user when the program determines in the first procedure that the platform is provided and determines in the second procedure that the device identification data is not yet registered.

The action of the first embodiment of the invention is as follows. A computer executes the program of the first embodiment of the invention. The computer verifies by the first procedure of that program whether an platform guaranteeing that device identification data identifying a communication device cannot be rewritten by a user is provided in the communication device. Further, the computer verifies by the second procedure of that program whether the device identification data included in a registration request received from the communication device is not yet registered. Next, when determining in the first procedure that the platform is provided and determining in the second procedure that the data is not yet registered, the computer performs processing by the third procedure of that program to register the device identification data included in the registration request and issue user identification data to the user.

According to a second embodiment of the invention, there is provided a communication device having an interface for receiving a registration request from another communication device and an execution circuit for performing processing for verifying whether an platform guaranteeing that device identification data for identifying the other communication device cannot be rewritten by a user is provided in the other communication device by communicating with the other communication device through the interface, verifying whether the device identification data included in a registration request received from the other communication device is not yet registered, and registering the device identification data included in the registration request and issuing user identification data to the user when determining that the other communication device is provided with the platform and that the device identification data is not yet registered.

The action of the second embodiment of the invention is as follows. An execution circuit verifies whether an platform guaranteeing that device identification data for identifying the other communication device cannot be rewritten by a user is provided in the other communication device by communicating with the other communication device through the interface. Further, the execution circuit verifies whether the device identification data included in a registration request received from the other communication device is not yet registered. When determining that the other communication device is provided with the platform and that the device identification data is not yet registered, the execution circuit registers the device identification data included in the registration request and issues user identification data to the user.

According to a third embodiment of the invention, there is provided a data processing method comprising the steps of verifying whether an platform guaranteeing that device identification data for identifying a communication device cannot be rewritten by the user is provided in the communication device, verifying whether the device identification data included in a registration request received from the communication device is not yet registered, and registering the device identification data included in the registration request and issuing user identification data to the user when determining in the first procedure that the platform is provided and determining in the second procedure that the device identification data is not yet registered.

According to a fourth embodiment of the invention, there is provided a program for making a computer perform a first procedure for assigning single unique pseudonym identification data used for verifying an platform to each of a plurality of users and verifying that an platform guaranteeing that the pseudonym identification data cannot be rewritten by the users is provided at the communication device, a second procedure for verifying whether pseudonym identification data received from the communication device is not yet registered, and a third procedure for performing processing for registering the pseudonym identification data received from the communication device and issuing user identification data to the user relating to the registration request when determining in the first procedure that the platform is provided in the communication device and determining in the second procedure that the data is not yet registered.

The action of the program of the fourth embodiment of the invention is as follows: A computer executes the program of the fourth embodiment of the invention. The computer assigns single unique pseudonym identification data used for verifying an platform to each of a plurality of users and verifies that an platform guaranteeing that the pseudonym identification data cannot be rewritten by the users is provided at the communication device in accordance with the first procedure of that program. Further, the computer verifies whether pseudonym identification data received from the communication device is not yet registered in accordance with a second procedure of that program. Further, the computer performs processing for registering the pseudonym identification data received from the communication device and issuing user identification data to the user relating to the registration request when determining in the first procedure that the platform is provided in the communication device and determining in the second procedure that the data is not yet registered in accordance with a third procedure of that program.

According to a fifth embodiment of the invention, there is provided a communication device having an interface for receiving a registration request from another communication device and an execution circuit for performing processing for assigning single unique pseudonym identification data used for verifying an platform to each of a plurality of users, verifying whether an platform guaranteeing that the pseudonym identification data cannot be rewritten by the user is provided in the other communication device, verifying whether the pseudonym identification data received from the other communication device is not yet registered, and registering the pseudonym identification data received from the other communication device through the interface and issuing user identification data to the user relating to the registration request when determining in the verification that the platform is provided in the other communication device and the data is not yet registered.

The action of the communication device of the fifth embodiment of the invention is as follows: An execution circuit assigns single unique pseudonym identification data used for verifying an platform to each of a plurality of users and verifies whether an platform guaranteeing that the pseud-onym identification data cannot be rewritten by the user is provided in the other communication device. Further, the execution circuit verifies whether the pseudonym identification data received from the other communication device is not yet registered. When determining that the platform is provided in the other communication device and the data is not yet registered, it registers the pseudonym identification data received from the other communication device through the interface and issues user identification data to the user relating to the registration request.

According to a sixth embodiment of the invention, there is provided a data processing method executed by a computer, comprising a first step of assigning single unique pseudonym identification data used for verifying an platform to each of a plurality of users and verifying whether an platform guaranteeing that the pseudonym identification data cannot be rewritten by the user is provided at a communication device, a second step of verifying whether the pseudonym identification data received from the communication device is not yet registered, and a third step of registering the pseudonym identification data received from the communication device and issuing user identification data to the user relating to the registration request when determining at the first step that the platform is provided in the communication device and at the second step that the data is not yet registered.

According to a seventh embodiment of the invention, there is provided a communication system having a first communication device for transmitting a registration request including device identification data and a second communication device for issuing user identification data in accordance with the registration request received from the first communication device, the second communication device verifying whether an platform guaranteeing that device identification data for identifying the first communication device cannot be rewritten by a user is provided at the other communication device by communicating with the first communication device through the interface, verifying whether the device identification data included in a registration request received from the first communication device is not yet registered, and registering the device identification data included in the registration request and issuing user identification data to the user when determining that the first communication device is provided with the platform and that the device identification data is not yet registered.

In summary, according to the present invention, it is possible to provide a program, a communication device, a data processing method, and a communication system able to issue a anonymous user ID guaranteeing user anonymity and singularity without a user providing personal information and with a small amount of communication.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below communication systems according to embodiments of the present invention will be explained.

First Embodiment

Below, a first embodiment of the present invention will be explained with reference to FIG. 1 to FIG. 9. The present embodiment corresponds to the first to third and seventh embodiments of the invention.

Correspondence with Configuration the Present Invention

First, the correspondence between the components of the present embodiment and the components of the present invention will be explained. Here, the server apparatus S shown in FIG. 1 etc. corresponds to the communication device of the second embodiment of the invention and the computers of the first and third embodiments of the invention. Further, the anonymous user ID of the present embodiment corresponds to the user identification data of the present invention, while the hardware ID of the present embodiment corresponds to the device identification data of the present invention. Further, the interface 42 shown in FIG. 4 corresponds to the interface of the second embodiment of the invention, while the CPU 45 corresponds to the execution circuit of the second embodiment of the invention. Further, step ST32 shown in FIG. 8 corresponds to the first procedure of the first embodiment of the invention and the first step of the third embodiment of the invention. Further, step ST33 shown in FIG. 8 corresponds to the second procedure of the first embodiment of the invention and the second step of the third embodiment of the invention. Further, steps ST34 and ST35 shown in FIG. 8 correspond to the third procedure of the first embodiment of the invention and the third step of the third embodiment of the invention.

Figure 1:
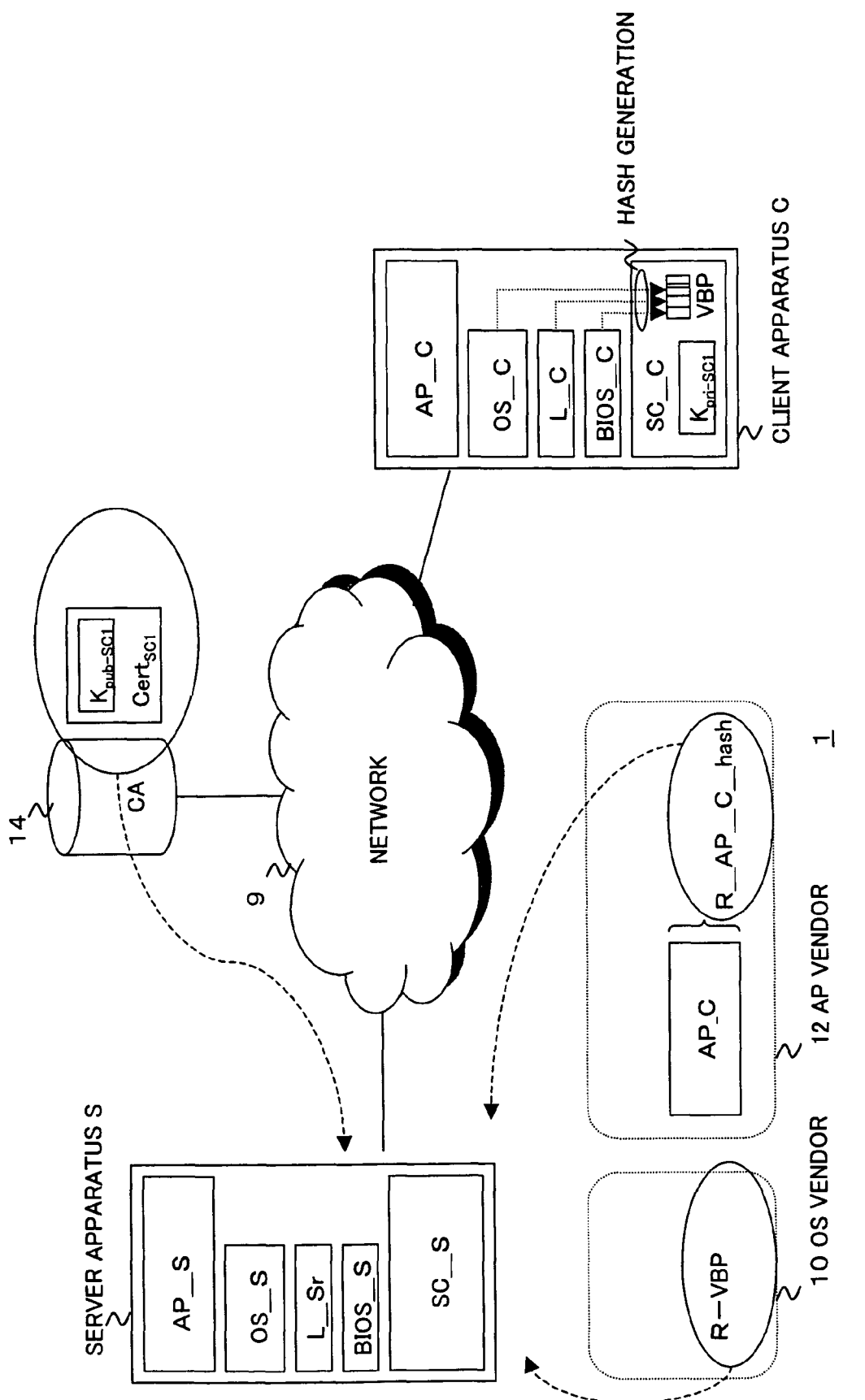
FIG. 1 is a view of the overall configuration of a communication system according to a first embodiment of the present invention.

FIG. 1 is a view of the overall configuration of a communication system 1 of the first embodiment of the present invention. As shown in FIG. 1, the communication system 1 for example has an operating system (OS) vendor 10, application program (AP) vendor 12, certification authority 14, client apparatus C, and server apparatus S. In the present embodiment, a client apparatus C is a personal computer, mobile phone, etc. used by a general user. Further, the server apparatus S is a computer providing for example a site for communication among a plurality of users such as a chat room, bulletin board, or auction.

OS Vendor 10

The OS vendor 10 is, for example, a vendor for providing a program BIOS_C, loader program L_C, and operating system OS_C built into a client apparatus C. Further, the OS vendor 10 generates hash data of the program BIOS_C, loader program L_C, and operating system OS_C, generates verification data of boot program, stores these in a predetermined bit field, and provides (transmits) this as reference verification data of boot prgram R_VBP to the server apparatus S.

AP Vendor 12

The AP vendor 12 is a vendor providing an application program AP_C operating on the client apparatus C to the client apparatus C. The AP vendor 12 generates the hash data of the application program AP_C and provides this as the reference hash data R_AP_C in a secure state to the server apparatus S.

Certification Authority 14

The certification authority 14 provides public key certification data Cert_SC1 of the security chip SC_C of the client apparatus C to the server apparatus S. Further, the certification authority 14 provides private key data Kpri_SC1 corresponding to the public key certification data Cert_SC1 to the client apparatus C.

Below, the client apparatus C and server apparatus S will be explained.

Client Apparatus C

The client apparatus C has a tamper-proof circuit (hardware) comprised of a security chip SC_C, a not shown CPU, a memory, and an interface of a network 9. Here, the tamper-proof circuit is a circuit designed to prevent mistaken operation or leakage of internal data when that circuit is attacked from the outside (attack for illicitly reading out internal data or setting input frequency or input voltage outside predetermined ranges). In the present embodiment, the security chip SC_C stores identification data inherent to the client apparatus C, that is, the hardware ID. That hardware ID is protected so that it cannot be rewritten by the user. The client apparatus C, when booted, successively boots the program BIOS_C, loader program L_C, operating system OS_C, and application program AP_C. These programs realize an platform guaranteeing that the hardware ID cannot be written by the user. Further, the client apparatus C automatically and forcibly generates the hash data of the above booted up programs.

Below, examples of operation of the client apparatus C will be explained.

First Example of Operation

Figure 2:
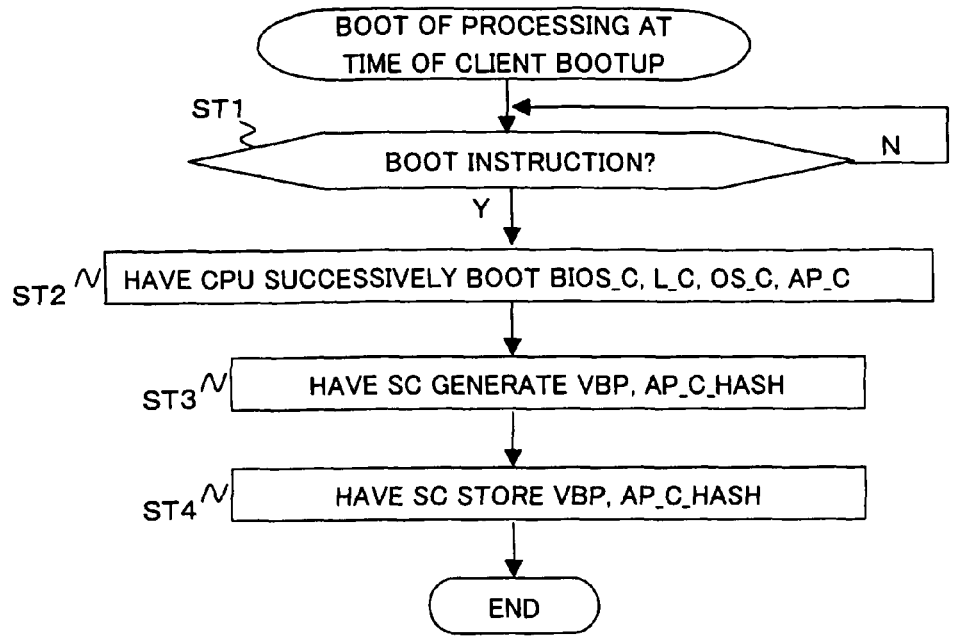
FIG. 2 is a flow chart for explaining the time of boot of the client apparatus shown in FIG. 1.

Below, an example of operation of the client apparatus C being booted will be explained. FIG. 2 is a flow chart for explaining that example of operation.

Step ST1

The CPU of the client apparatus determines if the client apparatus C has been booted. When determining it has been booted, the procedure proceeds to step ST2.

Step ST2

The CPU successively reads out and executes (boots up) from the memory the program BIOS_C, the loader program L_C, and the operating system OS_C. Next, the CPU boots from the memory the application program AP_C.

Step ST3

The security chip SC_C generates the hash data of the program BIOS_C, loader program L_C, and operating system OS_C booted at step ST2 and generates verification data of boot program storing these at a predetermined field. Further, the security chip SC_C generates the hash data AP_C_hash of the application program AP_C booted at step ST2.

Step ST4

The security chip SC_C writes the verification data of boot program and hash data AP_C_hash generated at step ST3 in the memory.

Second Example of Operation

Figure 3:
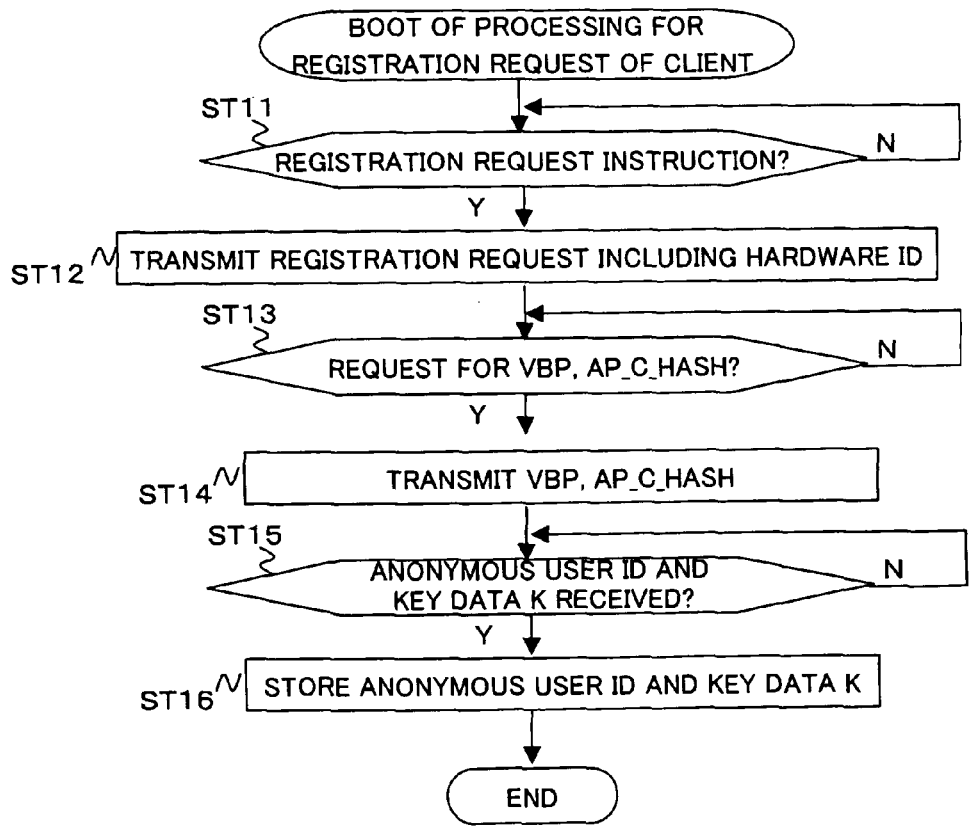
FIG. 3 is a flow chart for explaining the processing when the client apparatus shown in FIG. 1 makes a registration request.

Below, an example of operation of the client apparatus C transmitting a registration request for a anonymous user ID to the server apparatus will be explained. FIG. 3 is a flow chart for explaining that example of operation.

Step ST11

The CPU of the client apparatus determines if an instruction for a registration request for a anonymous user ID has been input by the user. When determining that it has been input, the procedure proceeds to step ST12.

Step ST12

The CPU of the client apparatus reads out from the security chip SC_C the hardware ID and transmits a registration request including this to the server apparatus S.

Step ST13

The CPU of the client apparatus determines if it has received from the server apparatus S a request for the verification data of boot program and hash data AP_C_hash. When determining that it has received them, the procedure proceeds to step ST14.

Step ST14

The CPU of the client apparatus reads out the verification data of boot program and hash data AP_C_hash generated and stored by the above first example of operation from the memory and transmits them to the server apparatus S.

Step ST15

The CPU of the client apparatus determines if it has received from the server apparatus S the anonymous user ID and key data K. When determining that it has received them, the procedure proceeds to step ST16.

Step ST16

The CPU of the client apparatus writes the anonymous user ID and the key data K received at step ST15 into the security chip SC_C. At this time, the key data K is encrypted by the public key data KPUb-SC1 of the client apparatus C. The CPU decrypts that key data K based on the private key data Kpri-SC1 and writes it into the security chip SC_C. After this, when transmitting data to the server apparatus S, the client apparatus CPU encrypts that data by the key data K, adds the anonymous user ID to the encrypted data, and transmits the results.

[Server Apparatus S]

Figure 4:
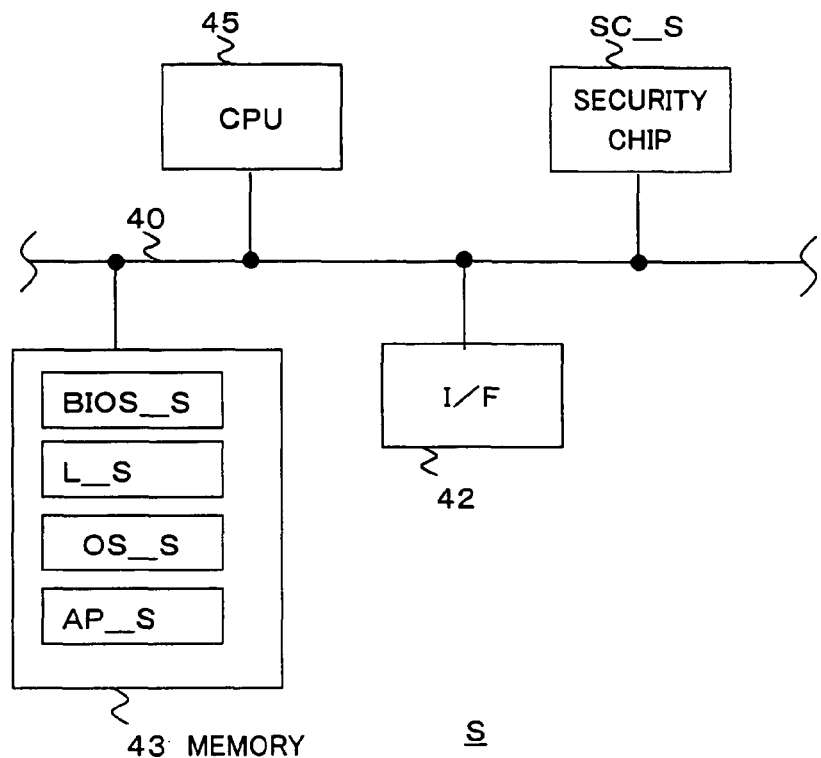
FIG. 4 is a view of the configuration of the server apparatus shown in FIG. 1.

FIG. 4 is a view of the configuration of the server apparatus S shown in FIG. 1. As shown in FIG. 4, the server apparatus S has for example an interface 42, a memory 43, a security chip SC_S, and a CPU 45. These are connected via a data line 40.

The interface 42 sends and receives data and requests through the network 9 with the client apparatus C. The memory 43 stores the program BIOS_S, loader program L_S, operating system OS_S, and application program AP_S.

Figure 5:
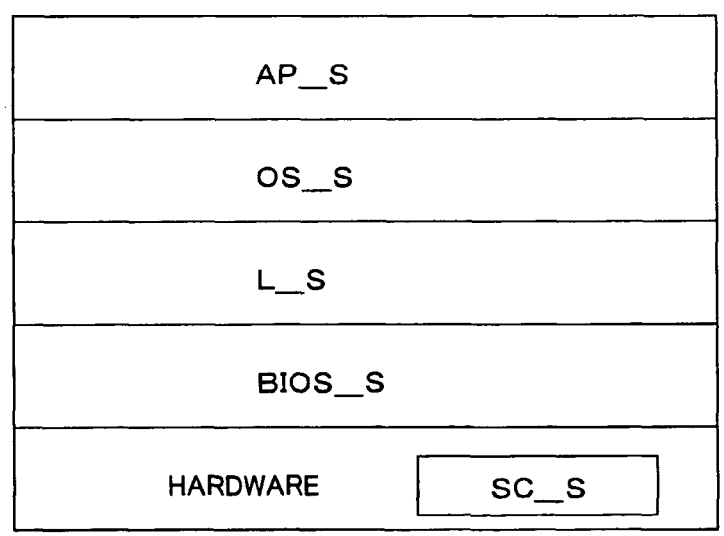
FIG. 5 is a view for explaining a software environment of a server apparatus shown in FIG. 5.

The CPU 45 reads out the various programs stored in the memory 43 to realize a predetermined software environment. The CPU 45, for example, as shown in FIG. 5, operates the program BIOS_S on the CPU 45, security chip SC_S, and other hardware. Further, the CPU 45 operates the loader program L_S on the program BIOS_S and operating system OS_S based on the loader program L_S. Further, the CPU 45 boots the application program AP_S on the operating system OS_S. The CPU 45 comprehensively controls the processing of the server apparatus S as follows in accordance with the application program AP_S. Note that the application program AP_S corresponds to the program of the first embodiment of the invention.

As explained above, the security chip SC is a tamper-proof circuit, that is, a circuit designed to prevent mistaken operation or leakage of internal data when that circuit is attacked from the outside (attack for illicitly reading out internal data or setting input frequency or input voltage outside predetermined ranges).

Figure 6:
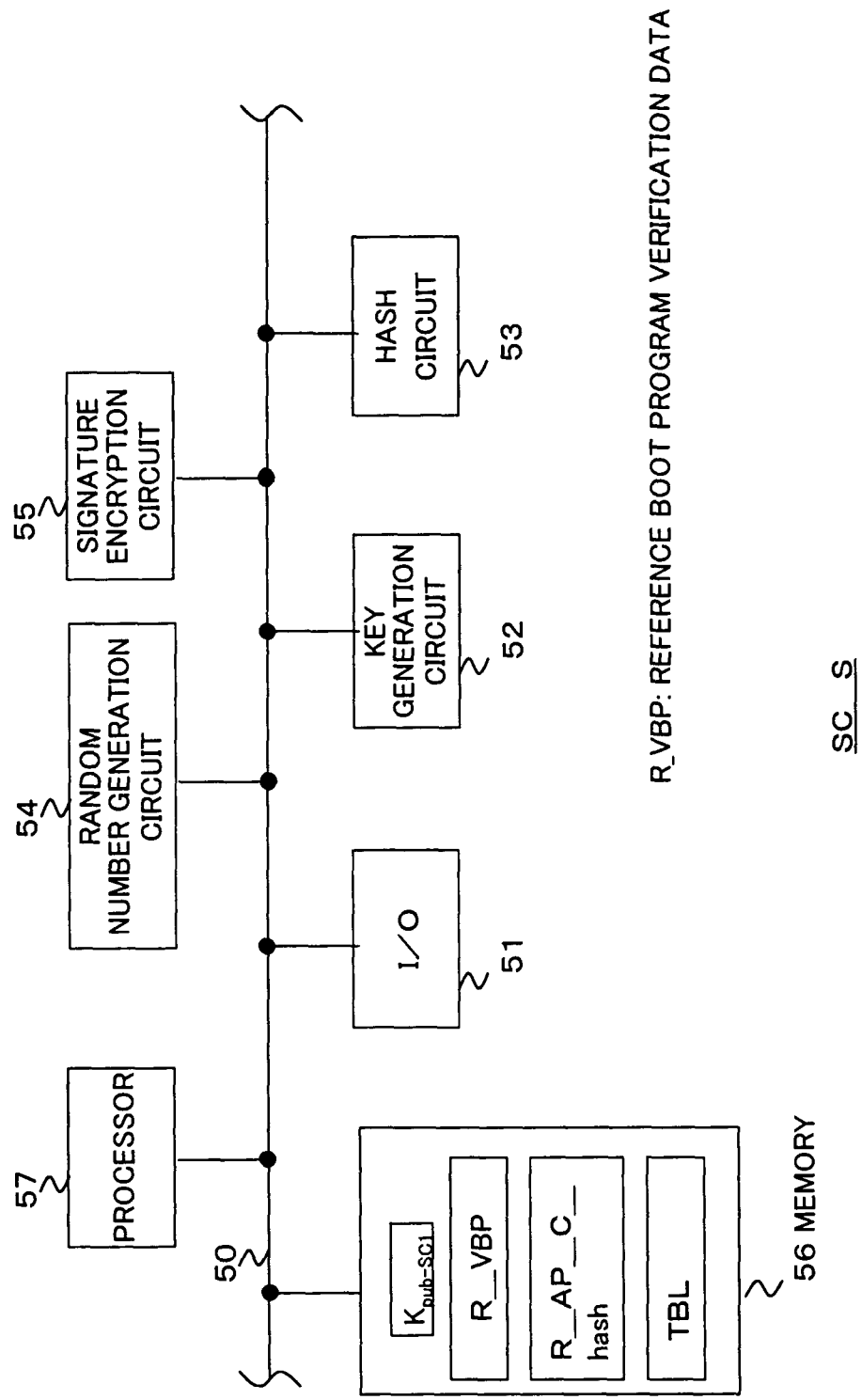
FIG. 6 is a view of the configuration of the security chip shown in FIG. 4.

FIG. 6 is a view of the configuration of the security chip SC_S shown in FIG. 4. As shown in FIG. 6, the security chip SC_S, for example, has an input/output circuit (I/O) 51, a key generation circuit 52, a hash circuit 53, a random number generation circuit 54, a signature encryption circuit 55, a memory 56, and a processor 57. These are connected via a data line 50.

The input/output circuit 51 is connected to the data line 40 shown in FIG. 4 and inputs and outputs data between the inside and outside of the security chip SC_S. The key generation circuit 52 generates various key data relating to security based on, for example, a random number generated by the random number generation circuit 54. The hash circuit 53 generates hash data. The random number generation circuit 54 generates a random number. The signature encryption circuit 55 performs encryption and decryption using the key data, generates encrypted data, decrypts encrypted data, generates signature data, and verifies the signature data. The program 57 storing the program PRG_SC in the memory 56 comprehensively controls the operation of the security chip SC based on the control from the CPU 45 shown in FIG. 4.

Below, examples of the operation of the server apparatus S will be explained.

First Example of Operation

Figure 7:
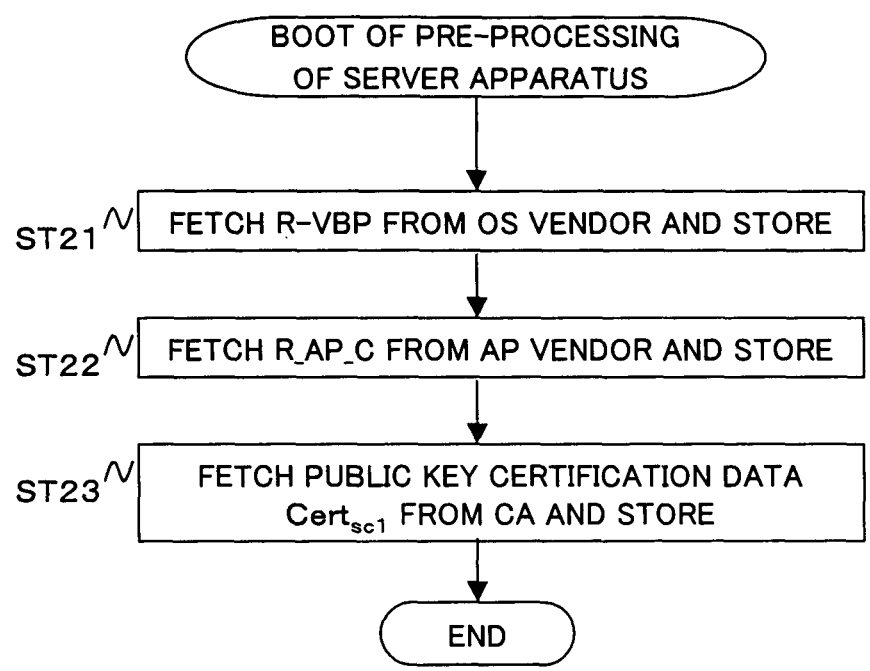
FIG. 7 is a flow chart for explaining the preprocessing of the server apparatus shown in FIG. 4.

Below, pre-processing of the server apparatus S will be explained. FIG. 7 is a flow chart for explaining that processing.

Step ST21

The CPU 45 of the server apparatus S shown in FIG. 4 receives as input the above-mentioned reference verification data of boot program R_VBP provided through the interface 42 by the OS vendor 10 and writes this in the memory 43.

Step ST22

The CPU 45 receives as input for example the reference hash data R_AP_C provided through the interface 42 by the AP vendor 12 and writes this in the memory 43.

Step ST23

The CPU 45, for example, receives as input the public key certification data Cert_SC1 provided through the interface 42 by the certification authority 14 and writes this in the memory 43. Note that the public key certification data Cert_SC1 contains public key data.

Second Example of Operation

Figure 8:
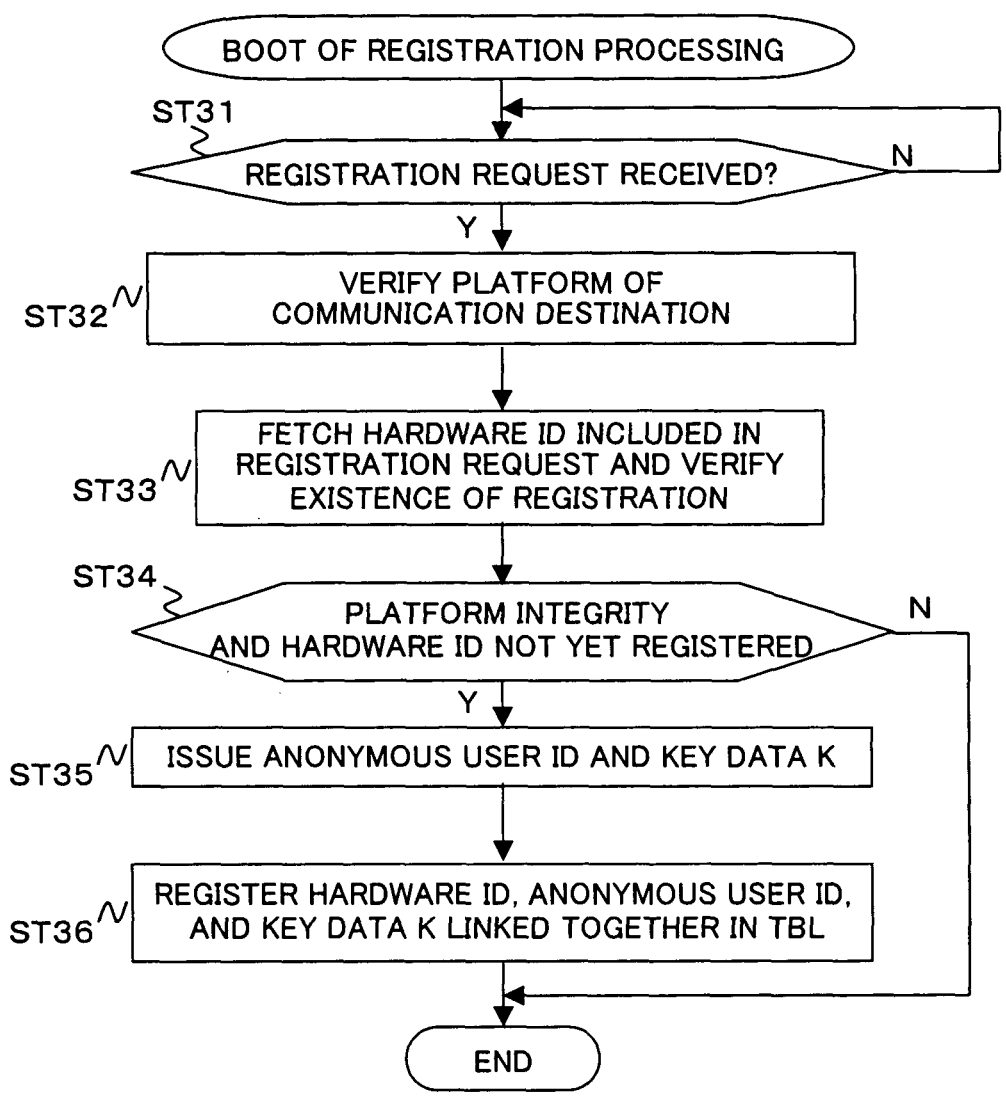
FIG. 8 is a flow chart for explaining the processing for a registration request of the server apparatus shown in FIG. 4.

Below, an example of operation of the server apparatus S in the case of receiving from the client apparatus C a registration request will be explained. FIG. 8 is a flow chart for explaining that example of operation.

Step ST31

The CPU 45 of the server apparatus S shown in FIG. 4 determines if it has received a registration request through the interface 42 from the client apparatus C. When it determines that it has received it, the procedure proceeds to step ST32.

Step ST32

The CPU 45 verifies the platform of the destination of the communication, that is, the client apparatus C. Specifically, the CPU 45 requests the verification data of boot program and hash data AP_C_hash through the interface 42 from the client apparatus C.

Further, the CPU 45 compares the verification data of boot program and hash data AP_C_hash received from the client apparatus C through the interface 42 in accordance with the above request and reference verification data of boot prgram R_VBP and reference hash data R_AP_C stored at steps ST21 and ST22 stored in the reference shown in FIG. 7 and determines that the platform of the client apparatus C is legitimate when the two match that and that that platform is illegitimate when they do not.

In the present embodiment, the "legitimate platform" of the client apparatus C means that the program BIOS_C, loader program L_C, operating system OS_C, and application program AP_C are booted in the platform in the client apparatus C, that is, an platform in the client apparatus C where the hardware ID being unable to be rewritten by the user is guaranteed. Further, in that platform, the hardware ID is automatically (forcibly) added to the registration request.

Step ST33

The CPU 45 fetches the hardware ID of the client apparatus included in the registration request received at step ST31 and verifies if this hardware ID has already been registered.

Step ST34

When the CPU 45 determines at step ST32 that the platform of the client apparatus C has integrity and, at step ST33, determines that the hardware ID has not yet been registered, the procedure proceeds to step ST35. When not, the processing is ended.

Step ST35

The CPU 45, for example, issues a unique anonymous user ID in the provider of the server apparatus S. Further, the key generation circuit 52 shown in FIG. 6 generates key data K corresponding to the anonymous user ID generated by the security chip SC_S under the control of the CPU 45.

Step ST36

The CPU 45 registers the hardware ID fetched at step ST33, the anonymous user ID generated at step ST35, and matters shown in correspondence with the key data K in table data TBL.

Third Example of Operation

Figure 9:
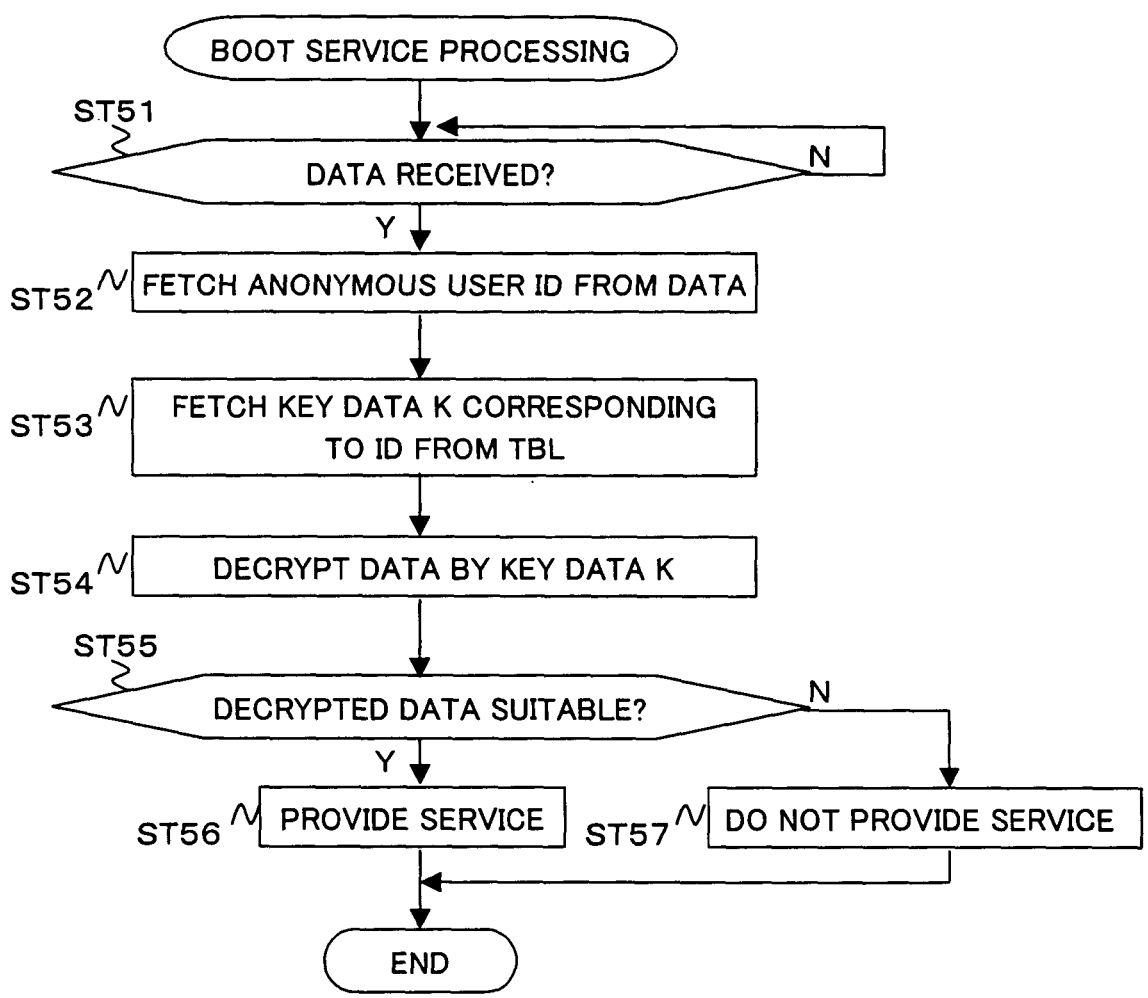
FIG. 9 is a flow chart for explaining the processing for providing a service of the server apparatus shown in FIG. 4.

Below, an example of operation of the server apparatus S in the case of receiving data from the client apparatus C will be explained. FIG. 9 is a flow chart for explaining that example of operation.

Step ST51

The interface 42 of the server apparatus S shown in FIG. 4 receives the data from the client apparatus C. That data includes the anonymous user ID and the encrypted data encrypted by the above-mentioned key data K.

Step ST52

The CPU 45 of the server apparatus S fetches the anonymous user ID from the data received at step ST51.

Step ST53

The CPU 45 fetches the key data K corresponding to the anonymous user ID fetched at step ST52 from the table data TBL explained at step ST36 shown at FIG. 8.

Step ST54

The CPU 45 decrypts the encrypted data included in the data received at step ST51 based on the key data K fetched at step ST53.

Step ST55

The CPU 45 determines if the data decrypted at step ST54 has been suitably decrypted. When it determines that it has been suitably decrypted, the procedure proceeds to step ST56. When not, the procedure proceeds to step ST57.

Step ST56

The CPU 45 provides predetermined services using the data decrypted at step ST54. For example, the CPU 45 performs processing for uploading that data to a bulletin board when the data decrypted at step ST54 is matter placed on the bulletin board.

Step ST57

The CPU 45 does not provide any service using the data decrypted at step ST54 and notifies the client apparatus C to this effect.

As explained above, in the communication system 1, after the server apparatus S verifies that the program BIOS_C, the loader program L_C, the operating system OS_C, and the application program AP_C client apparatus C have been booted in the client apparatus C, that is, the platform is one which guarantees that the hardware ID cannot be written by the user at steps ST32 and ST34 shown in FIG. 8, then issues a anonymous user ID.

For this reason, a single user of a client apparatus C acquiring a plurality of anonymous user ID's can be avoided and singularity of the anonymous user ID's can be guaranteed without going through the server apparatus of the TTP.

Due to this, the user of the client apparatus C does not have to provide his or her own personal information to the server apparatus of the TTP, so it is possible to improve the confidentiality of personal information. Further, the client apparatus C and server apparatus S directly communicate and do not communicate with the server apparatus of the TTP, so the load of the communication processing can be lightened. Further, according to the communication system 1, it is also possible to prevent identity theft from being used to illicitly tamper with or steal information of other parties held by the server apparatus S.

Second Embodiment

Figure 10:
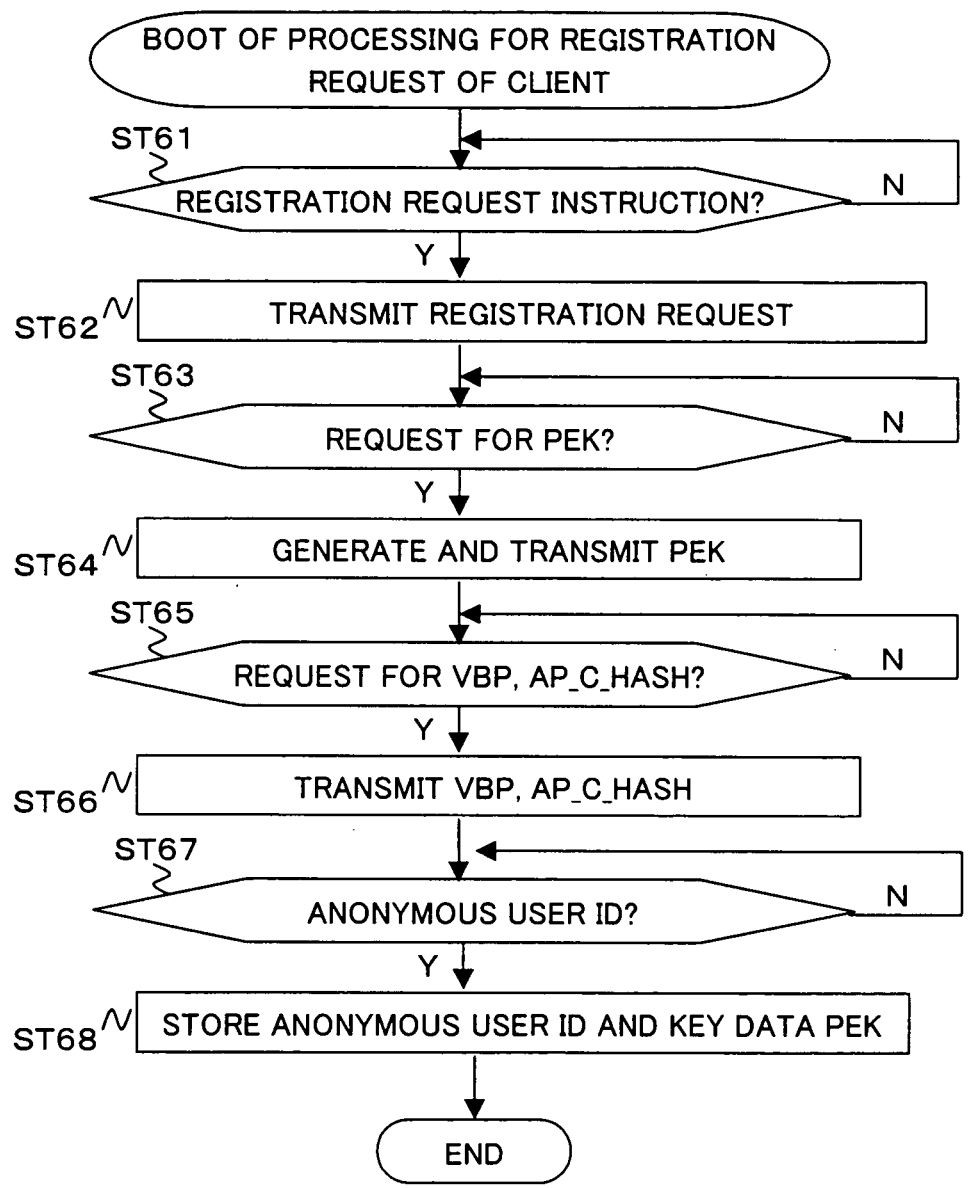
FIG. 10 is a flow chart for explaining the processing in the case of the client apparatus of the second embodiment of the present invention making a registration request.

Below, a second embodiment of the present invention will be explained referring to FIG. 10 to FIG. 12. The present embodiment corresponds to the fourth to sixth embodiments of the invention. In the above-mentioned embodiment, when the client apparatus C is used by a single user, the server apparatus decides whether to issue a anonymous user ID based on whether the hardware ID included in the registration request is registered in the table data TBL. In the present embodiment, when the client apparatus C is used by a plurality of users, the server apparatus generates individual private encryption key PEK for each user. When booted, the client apparatus C successively boots the program BIOS_C, the loader program L_C, the operating system OS_C, and the application program AP_C and provides the platform shown below by these programs. That is, the client apparatus C generates (issues) a plurality of private encryption key data PEK used for verifying the platform, assigns to a single user a single unique private encryption key data PEK, and provides an platform guaranteeing that the private encryption key data PEK cannot be rewritten by the user.

[Correspondence with Configuration of Present Invention]

First, the correspondence between components of the present embodiment and components of the present invention will be explained. Here, the server apparatus S shown in FIG. 1 etc. corresponds to the communication device of the second embodiment of the invention and the computers of the first and third embodiments of the invention. Further, the anonymous user ID of the present embodiment corresponds to the user identification data of the present invention, while the private encryption key data PEK of the present embodiment corresponds to the pseudonym identification data of the present invention. Further, the interface 42 shown in FIG. 4 corresponds to the interface of the second embodiment of the invention, while the CPU 45 corresponds to the execution circuit of the second embodiment of the invention. Further, step ST72 shown in FIG. 10 corresponds to the first procedure of the fourth embodiment of the invention and the first step of the sixth embodiment of the invention. Further, step ST75 shown in FIG. 10 corresponds to the second procedure of the fourth embodiment of the invention and the second step of the sixth embodiment of the invention. Further, step ST76 shown in FIG. 10 corresponds to the third procedure of the fourth embodiment of the invention and the third step of the sixth embodiment of the invention.

First, an example of operation in the case of the client apparatus C in the present embodiment transmitting a registration request for a anonymous user ID to the server apparatus will be explained. FIG. 10 is a flow chart for explaining that example of operation.

Step ST61

The CPU of the client apparatus determines if an instruction for a registration request for a anonymous user ID has been input by the user. When it determines that it has been input, the procedure proceeds to step ST62.

Step ST62

The CPU of the client apparatus transmits the registration request to the server apparatus S.

Step ST63

The CPU of the client apparatus determines if a request for a private encryption key data PEK has been received from the server apparatus S. When it determines that it has been received, the procedure proceeds to step ST64.

Step ST64

The CPU of the client apparatus generates private encryption key data PEK in the security chip SC. Here, the private encryption key data PEK is called "pseudonym certification data" and differs from the user certification data. It is used for certification of the platform (platform) used by the user. In the present embodiment, the security chip SC_C of the client apparatus C communicates with the server apparatus of a predetermined TTP (Trusted Third Party) to generate a pair of public key data and private key data. Further, the security chip SC_C transmits that public key data to the server apparatus of the TTP and adds it to the signature data. In the present embodiment, the security chip SC_C generates (issues) a plurality of private encryption key data PEK and assigns a single user single private encryption key data PEK. Further, in the present embodiment, the user cannot rewrite the private encryption key data PEK.

Step ST65

The CPU of the client apparatus determines if it has received from the server apparatus S a request for the verification data of boot program and hash data AP_C_hash. When it determines it has received them, the procedure proceeds to step ST66.

Step ST66

The CPU of the client apparatus reads out the verification data of boot program and hash data AP_C_hash generated and stored at the above first example of operation and transmits them to the server apparatus S.

Step ST67

The CPU of the client apparatus determines if it has received the anonymous user ID from the server apparatus S. When determining that it has received it, the procedure proceeds to step ST68.

Step ST68

The CPU of the client apparatus links the private encryption key data PEK generated at step ST64 and the anonymous user ID received at step ST67 and writes them in the security chip SC_C. After this, when transmitting data to the server apparatus, the client apparatus CPU encrypts that data by the private encryption key data PEK, adds the anonymous user ID to the encrypted data, and transmits the result.

Below, an example of operation of the server apparatus S in the case of receiving a registration request from the client apparatus C will be explained. FIG. 11 is a flow chart for explaining that example of operation.

Step ST71

The CPU 45 of the server apparatus S shown in FIG. 4 determines if it has received a registration request from the client apparatus C through the interface 42. When it determines that it has received it, the procedure proceeds to step ST72.

Step ST72

The CPU 45 verifies the platform of the destination of communication, that is, the client apparatus C. Specifically, the CPU 45 requests through the interface 42 from the client apparatus C the verification data of boot program and hash data AP_C_hash. Further, the CPU 45 compares the verification data of boot program and hash data AP_C_hash received from the client apparatus C through the interface 42 in accordance with the above request and the reference verification data of boot prgram R_VBP and reference hash data R_AP_C stored at steps ST21 and ST22 shown in FIG. 7. When the two match, it determines that the platform of the client apparatus C is legitimate. When they do not, it determines that the platform is improper. In the present embodiment, the "legitimate platform" of the client apparatus C means an platform which generates (issues) a plurality of private encryption key data PEK used for certifying the platform, assigns a single user a single private encryption key data guarantees that the private encryption key data PEK cannot be rewritten by the user.

Step ST73

When the CPU 45 determines at step ST72 that the platform of the client apparatus C has integrity, the procedure proceeds to step ST74. When not, the processing is ended.

Step ST74

The CPU 45 requests the private encryption key data PEK from the client apparatus C through the interface 42 and receives it from the client apparatus C through the interface 42.

Step ST75

The CPU 45 refers to the table data TBL and verifies if the private encryption key data PEK is not yet registered. If it determines it is not yet registered, the procedure proceeds to step ST76. If it determines that it is not yet registered, it ends the processing and transmits that effect to the client apparatus C.

Step ST76

The CPU 45, for example, issues a unique anonymous user ID in the provider of the server apparatus S.

Step ST77

The CPU 45 registers matter showing the linkage between the private encryption key data PEK received at step ST74 and the anonymous user ID generated at step ST76 in the table data TBL.

Below, an example of operation of the server apparatus S in the case of receiving data from the client apparatus C will be explained. FIG. 12 is a flow chart for explaining that example of operation.

Step ST81

The interface 42 of the server apparatus S shown in FIG. 4 receives the data from the client apparatus C. That data includes the anonymous user ID and encrypted data encrypted by the above-mentioned private encryption key data PEK.

Step ST82

The CPU 45 of the server apparatus S fetches the anonymous user ID from the data received at step ST81.

Step ST83

Figure 11:
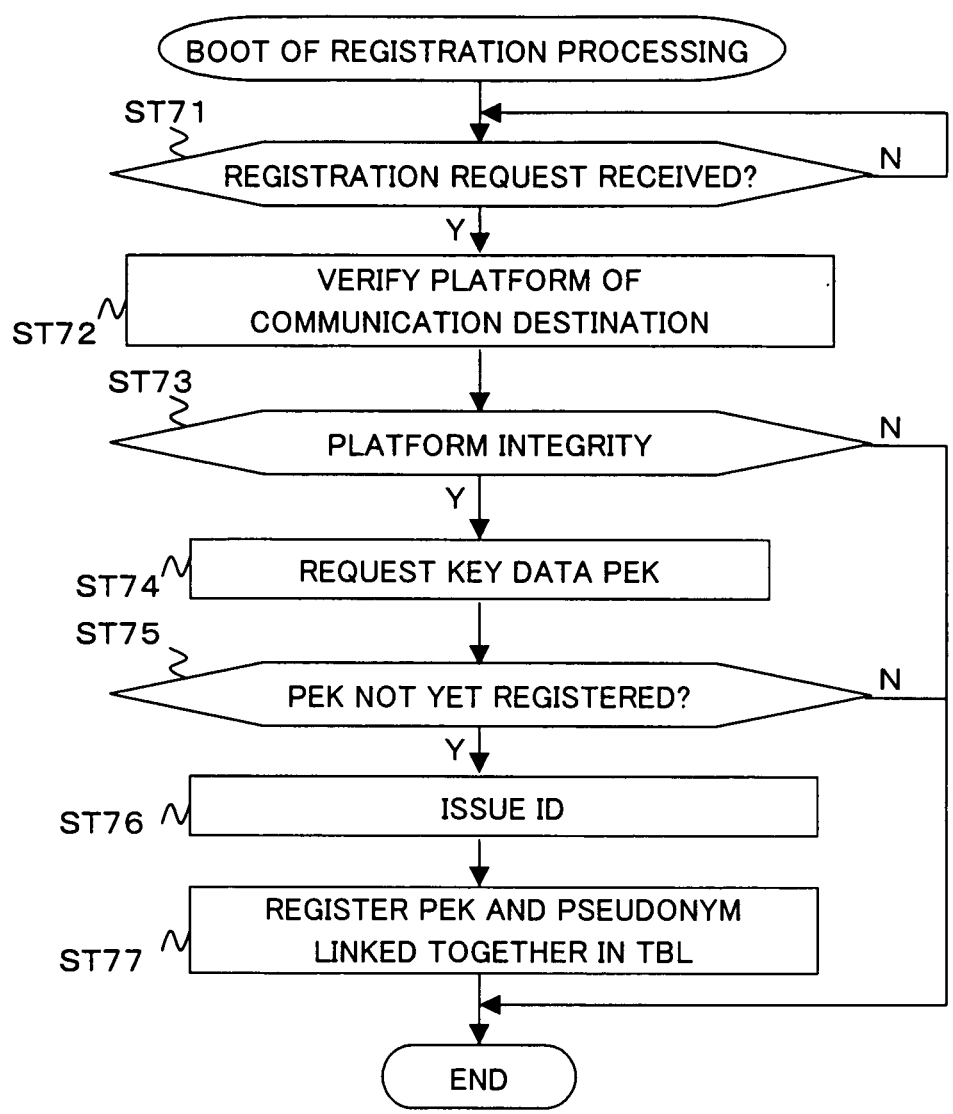
FIG. 11 is a flow chart for explaining a registration request of a server apparatus of a second embodiment of the present invention.
Figure 12:
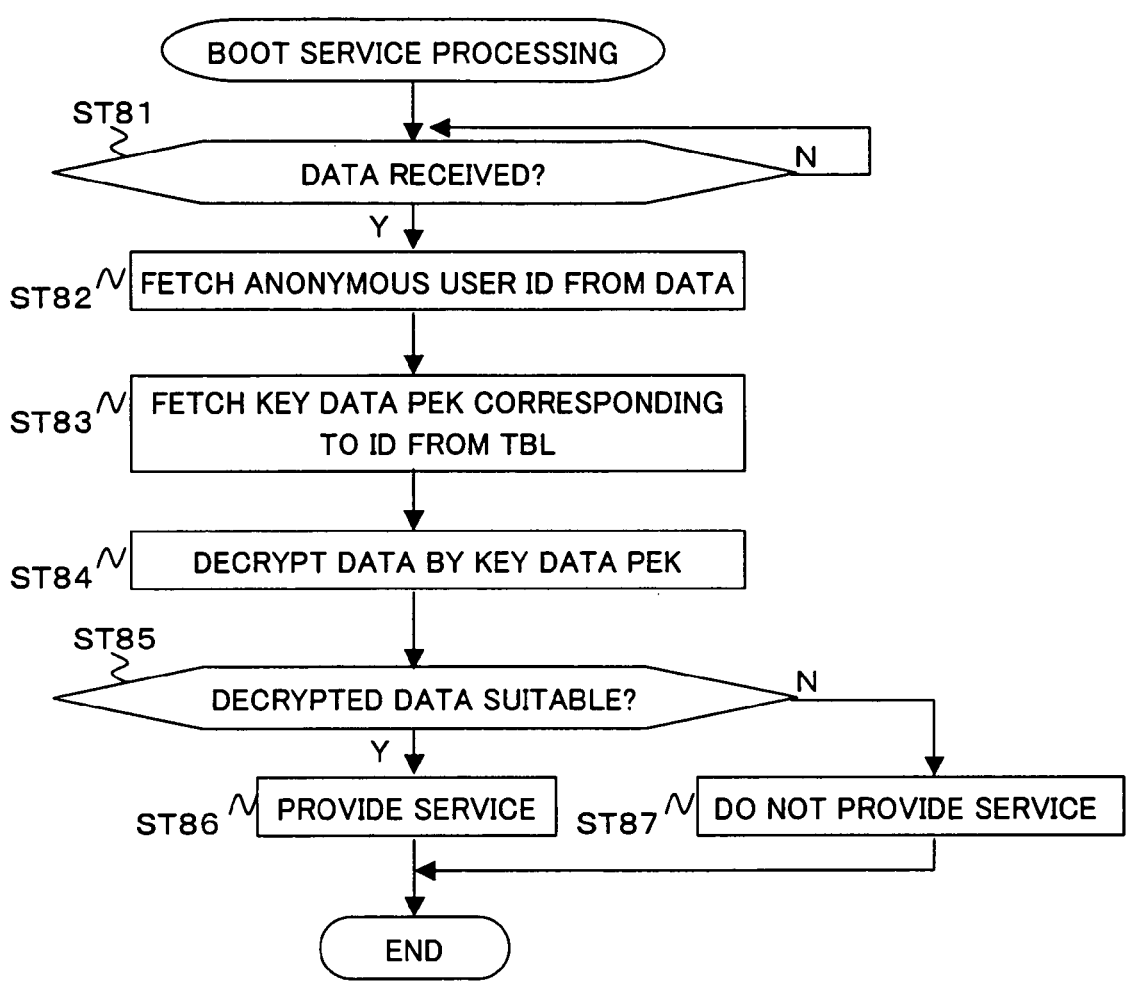
FIG. 12 is a flow chart for explaining the processing for providing a service of a server apparatus of the second embodiment of the present invention.

The CPU 45 fetches the private encryption key data PEK corresponding to the anonymous user ID fetched at step ST82 from the table data TBL explained at ST77 shown in FIG. 11.

Step ST84

The CPU 45 decrypts the encrypted data included in data received at step ST81 based on the private encryption key data PEK fetched at step ST83.

Step ST85

The CPU 45 determines if the data decrypted at step ST84 was suitably decrypted. When it determines that the data was suitably decrypted, the procedure proceeds to step ST86. When not, the procedure proceeds to step ST87.

Step ST86

The CPU 45 provides predetermined services using data decrypted at step ST84. For example, the CPU 45 performs processing for uploading the data to a bulletin board when the data encrypted at step ST84 is matter for placement on the bulletin board.

Step ST87

The CPU 45 does not provide any services using the data decrypted at step ST84 and notifies the client apparatus C of that effect.

As explained above, according to the present embodiment, even when the client apparatus C is used for a plurality of users, a single user of the client apparatus C transmitting a plurality of registration requests for anonymous user ID's can be avoided. If the private encryption key data PEK corresponding to the registration requests differ, the singularity of the anonymous user ID's can be guaranteed without going through the server apparatus of the TTP. Due to this, the user of the client apparatus C does not have to provide his or her own personal information to the server apparatus of the TTP, so it is possible to improve the confidentiality of the personal information. Further, the client apparatus C and the server apparatus S communicate directly and do not communicate with the server apparatus of the TTP, so the load in the communication processing can be lightened.

The present invention is not limited to the above-mentioned embodiments. In the above-mentioned embodiments, the case of the server apparatus S providing a bulletin board was illustrated, but the server apparatus S is not particularly limited so long as it provides a chat room, auction site, or other service using anonymous user ID's where anonymity and singularity of the user 9 are required in an open network 9. Further, the present invention can also be applied to network services customized for each individual in accordance with the characteristics of the same without requiring the user to provide personal information.

Further, in the above-mentioned second embodiment, the case of the client apparatus C generating the private encryption key data PEK and transmitting it to the server apparatus S in accordance with a request from the server apparatus S was illustrated. The present invention, for example, may also have the key data server apparatus S introduce pre-generated private encryption key data PEK in the registration request. Further, it may also include a anonymous user ID desired by the user included in the registration request. Further, as the key data K of the first embodiment and the private encryption key data PEK of the second embodiment, it is possible to use a user pass frame, bio information, key device (IC card ID), etc. combined.

The present invention can be applied to a system in which user anonymity and singularity are required in communication in a network etc.

It should be understood by those skilled in the art that various modifications, combinations, sub-combinations, and alterations may occur depending on design requirements and other factors insofar as they are within the scope of the appended claims or the equivalents thereof.

We claim:

1. A non-transitory computer readable storage medium encoded with computer program instructions which when executed, cause a computer to implement a method, comprising:

verifying whether a security chip is present in a first communication device by comparing first boot hash data generated in response to booting the first communication device via a boot program of the first communication device and received from the first communication device with second boot hash data received from a second communication device, the first and second boot hash data identifying the first communication device, the security chip guaranteeing that hardware identification data is provided in the first communication device and cannot be rewritten by a user of the first communication device;

verifying whether the hardware identification data included in a registration request received from the first communication device is not registered; and registering the hardware identification data included in the registration request and issuing unique anonymous user identification data and key data corresponding to the unique anonymous user identification data to the user when determining via security chip verification that the security chip is present and determining via registration verification that the hardware identification data is not registered.

2. The non-transitory computer readable storage medium of claim 1, wherein the hash data received from the first communication device is automatically generated at the security chip of the first communication device when a program is booted at the first communication device.

3. The non-transitory computer readable storage medium of claim 1, wherein the registering stores the key data linked with the user identification data, and the non-transitory computer readable storage medium includes computer instructions which cause the computer to execute processing, further comprising:

decrypting encrypted data received and linked with unique anonymous user identification data issued in the registering, using the key data linked with the unique anonymous user identification data.

4. The non-transitory computer readable storage medium of claim 3, wherein the first and second boot hash data includes program BIOS and operating system data of the booted first communication device.

5. The non-transitory computer readable storage medium of claim 4, wherein the verifying further compares first application hash data of an application program booted by the first communication device and received from the first communication device with second application hash data received from the second communication device.

6. The non-transitory computer readable storage medium of claim 1, wherein the first and second boot hash data includes program BIOS and operating system data of the booted first communication device.

7. The non-transitory computer readable storage medium of claim 6, wherein the verifying further compares first application hash data of an application program booted by the first communication device and received from the first communication device with second application hash data received from the second communication device.

8. A first communication device comprising:
an interface to receive a registration request from a second communication device; and
an execution circuit to
verify whether a security chip is present in the second communication device by comparing first boot hash data generated in response to booting the second communication device via a boot program of the second communication device and received from the second communication device with second boot hash data received from a third communication device, the first and second boot hash data identifying the second communication device, the security chip guaranteeing that hardware identification data is present in the second communication device and cannot be rewritten by a user of the second communication device,
verify whether the hardware identification data included in a registration request from the second communication device is not registered by communicating with the second communication device through the interface,
register the hardware identification data included in the registration request when the second communication device includes the security chip and the hardware identification data is not registered, and
issue unique anonymous identification data and key data corresponding to the unique anonymous user identification data to the second communication device when the second communication device includes the security chip and the hardware identification data is not registered.

9. A data processing method of a server device, comprising:
verifying whether a security chip is present in a first communication device, by comparing first boot hash data generated in response to booting the first communication device via a boot program the first communication device and received from the first communication device with second boot hash data received from a second communication device, the first and second boot hash data identifying the first communication device, to guarantee that hardware identification data is provided in the first communication device and cannot be written by a user of the first communication device,
verifying whether the first hardware data included in a registration request received from the first communication device is not registered; and
registering the hardware identification data included in the registration request and issuing unique anonymous user identification data and key data corresponding to the unique anonymous user identification data to the first communication device when security chip verification verifies that the security chip is present, and registration verification determines that the hardware identification data is not registered.

10. A non-transitory computer readable storage medium encoded with computer program instructions executable by a computer to cause the computer to implement a method, comprising:
assigning single unique pseudonym identification data used to verify a security chip to each of a plurality of users;
verifying that the security chip is present at a communication device by comparing first boot hash data generated in response to booting the communication device via a boot program of the communication device and received from the first communication device with second boot hash data received from a second communication device, the first and second boot hash data identifying the first communication device, the security chip guaranteeing that the pseudonym identification data cannot be rewritten by the users of the first communication device;
verifying whether pseudonym identification data received from the first communication device is not registered;
registering the pseudonym identification data received from the first communication device; and
issuing unique anonymous user identification data and key data corresponding to the unique anonymous user identification data to the user relating to the registration request when security chip verification verifies that the security chip is present in the first communication device and registration verification verifies that the pseudonym identification data is not registered.

11. The non-transitory computer readable storage medium of claim 10, wherein the registering stores the pseudonym identification data linked with the unique anonymous user identification data, and the non-transitory computer readable storage medium includes instructions executable by the computer, further comprising:
decrypting the encrypted data received and linked with the unique anonymous user identification data issued in the registering, using the pseudonym identification data linked with the unique anonymous user identification data in the registering.

12. A first communication device comprising:
an interface receiving a registration request from a second communication device; and
an execution circuit to
assign a single unique pseudonym identification data used to verify a security chip to each of a plurality of users,
verify whether the security chip is present at the second communication device by comparing first boot hash data generated in response to booting the second communication device via a boot program of the second communication device and received from the second communication device with second boot hash data received from a third communication device, the first and second boot hash data identifying the second communication device, the security chip guaranteeing that the pseudonym identification data cannot be rewritten by the user of the second communication device,
verify whether the pseudonym identification data received from the second communication device is not registered,
register said pseudonym identification data received from said second communication device through the interface when security chip verification verifies that the security chip is provided in the second communication device and the pseudonym identification data is not registered, and issue unique anonymous user identification data and key data corresponding to the unique anonymous user identification data to the user relating to the registration request when the verification verifies that the security chip is provided in the second communication device and the pseudonym identification data is not registered.

13. A data processing method executed by a server device, comprising:

assigning single unique pseudonym identification data used to verify a security chip to each of a plurality of users;

verifying that the security chip is present at a communication device by comparing first boot hash data generated in response to booting the communication device via a boot program of the communication device and received from the communication device with second identification data received from a second communication device, the first and second boot hash data identifying the first communication device, the security chip guaranteeing that the pseudonym identification data cannot be rewritten by the users of the first communication device;

verifying whether the pseudonym identification data received from the first communication device is not registered;

registering the pseudonym identification data received from the first communication device; and issuing unique anonymous user identification data and key data corresponding to the unique anonymous user identification data to the user relating to the registration request when determining at the first step that the security chip is provided in the first communication device and determining via registration verification that the pseudonym identification data is not registered.

14. A communication system comprising:

a first communication device configured to transmit a registration request including first boot hash generated in response to booting the first communication device via a boot program of the first communication device data; and a second communication device configured to issue unique anonymous user identification data in accordance with the registration request received from the first communication device, the second communication device verifying whether a security chip is present at the first communication device by comparing the first boot hash data received from the first communication device with second identification data received from a third communication device, the first and second boot hash data identifying the first communication device, the security chip guaranteeing that hardware identification data cannot be rewritten by a user of the first communication device, by communicating with the first communication device through the interface, the second communication device verifying whether hardware identification data included in a registration request received from the first communication device is not registered, and the second communication device registering the hardware identification data included in the registration request and issuing unique anonymous user identification data to the user when determining that the first communication device is provided with the security chip and that the hardware identification data is not registered.

* * * * *